(12) United States Patent
Seel

(10) Patent No.: US 6,336,000 B1
(45) Date of Patent: *Jan. 1, 2002

(54) RETAIL VIDEO RECORDING BOOTH

(76) Inventor: Roy D. Seel, 18 Sunnyview Dr., St. Peters, MO (US) 63376

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/500,231

(22) Filed: Jul. 10, 1995

Related U.S. Application Data

(63) Continuation of application No. 07/950,859, filed on Jul. 13, 1992, now abandoned, which is a continuation of application No. 07/170,924, filed on Mar. 21, 1988, now abandoned.

(51) Int. Cl.$^7$ ................................................. H04N 5/76
(52) U.S. Cl. ........................... 386/46; 386/117; 360/55; 360/137; 369/12
(58) Field of Search ................................. 358/335, 310, 358/342; 360/55, 137; 354/290, 291; 369/12; 348/722; D4/1, 4; 386/1, 38, 39, 46, 96, 117, 118; H04N 5/76, 5/92

(56) References Cited

U.S. PATENT DOCUMENTS 3,864,708 A * 2/1975 Allen ......................... 354/290
4,688,105 A * 8/1987 Bloch et al. ................ 358/335

FOREIGN PATENT DOCUMENTS

FR 2559298 * 8/1985
GB 2162150 * 1/1986

OTHER PUBLICATIONS

Video Moonlighter Newsletter vol. 1, No. 3 1982.*

* cited by examiner

Primary Examiner—Thai Tran
(74) Attorney, Agent, or Firm—Henry W. Cummings

(57) ABSTRACT

A retail audio-video recording booth includes walls which define an enclosed area for a customer to make an audio video recording. A door assures privacy. A seat or bench allows the customer to sit or stand while he makes the recording. When the customer inserts a selected amount of money into a money receptacle, a video electronic circuit is activated. When the customer inserts a tape in a tape receptacle, the customer may make an audio/visual recording, play or hear a recording already recorded on the tape. If a recording is to be made, the recording which is being made may simultaneously be observed by the customer on a monitor. A camera is provided to make the recording, and a VCR is provided to show the recording. A two-way mirror is provided to transmit the picture being made to the VCR and the monitor at the same time. In a preferred embodiment a second mirror is used to transmit the picture from the monitor to the viewing window, whereby any letters or numbers which may be used in the recording will appear in the correct form, and will not appear reversed or upside down from the manner in which they were displayed in making the recording. Also in a preferred embodiment, after a recording is made the customer may either review the recording or rerecord over the recorded material.

9 Claims, 4 Drawing Sheets

RETAIL VIDEO RECORDING BOOTH

This application is a continuaton of application Ser. No. 07/950,859, filed Jul. 13, 1992, now abandoned, which is a continuation of application Ser. No. 07/170,924, filed Mar. 21, 1988, and now abandoned.

BACKGROUND OF THE INVENTION

In the U.S. Pat. No. 3,864,708 a booth is disclosed in which a customer may have a photograph taken of himself or herself, and the photograph is placed upon a postcard for transmittal through the mails. In this system there is no provision for making a video recording of the customer.

SUMMARY OF THE INVENTION

A. Objects

One object of the present invention is to provide a retail booth in which a customer may make an audio/video recording of himself/herself or play audio/video recordings in the booth.

Another object of the invention is to provide a video recording system in which numbers or letters which do not appear reversed or upside down from the position in which they were when the recording was made.

Another object of the invention is to provide a audio/video recording customer booth in which the customer may observe the recording being made on a monitor as the recording is being made. Another object is to provide a retail video recording booth which is inexpensive to assemble and stock.

B. Summary

A retail video recording booth includes walls which define an enclosed area for a customer to make a video recording. A door assures privacy. A seat or bench allows the customer to sit or stand while he makes the video. When the customer inserts a selected amount of money into a money receptacle a video electronic circuit is activated. When the customer inserts a video tape in a tape receptacle the customer may make a video/audio recording or hear or observe a tape recording already recorded on the tape. If a recording is to be made, the recording which is being made may simultaneously be observed by the customer on a monitor. A camera is provided to make the recording, and a VCR is provided to show the recording. A two-way mirror is provided to transmit the picture being made to the VCR and the monitor at the same time. In a preferred embodiment a second mirror is used to transmit the picture from the monitor the a viewing windows, whereby any letters or numbers which may be used in the recording will appear in the correct form, and will not appear reversed or upside down from the manner in which they were displayed in making the recording. Also in a preferred embodiment, after a recording is made the customer may either review the recording or rerecord over the recorded material.

THE DRAWINGS

DESCRIPTION OF PREFERRED EMBODIMENTS

Figure 1:
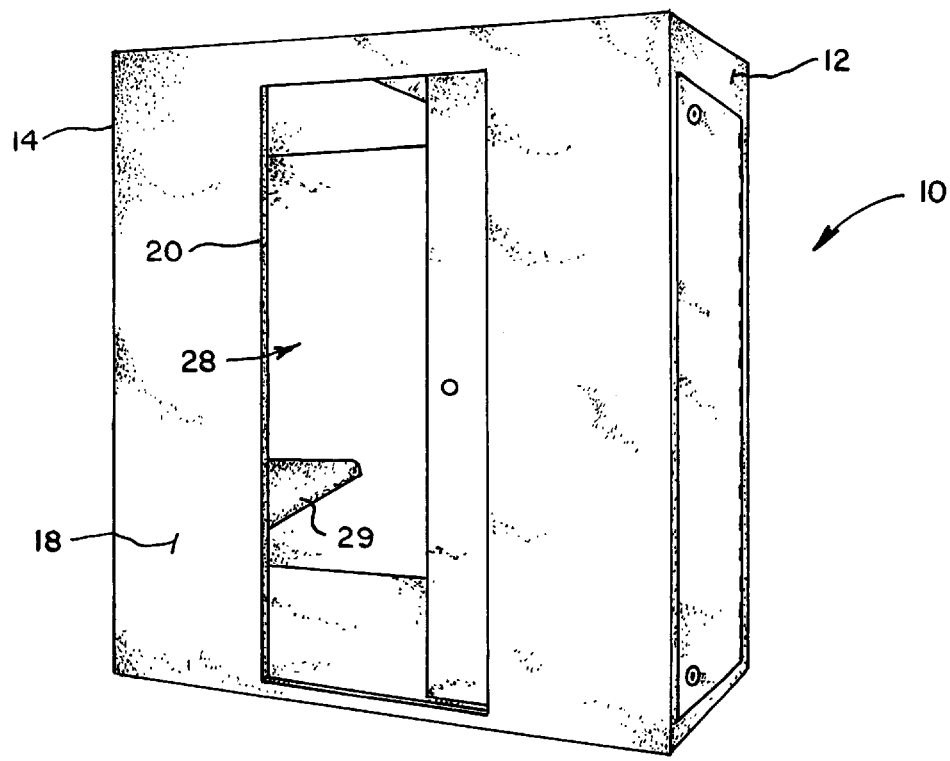
FIG. 1 is a perspective view of the retail recording booth of the present invention.
Figure 2:
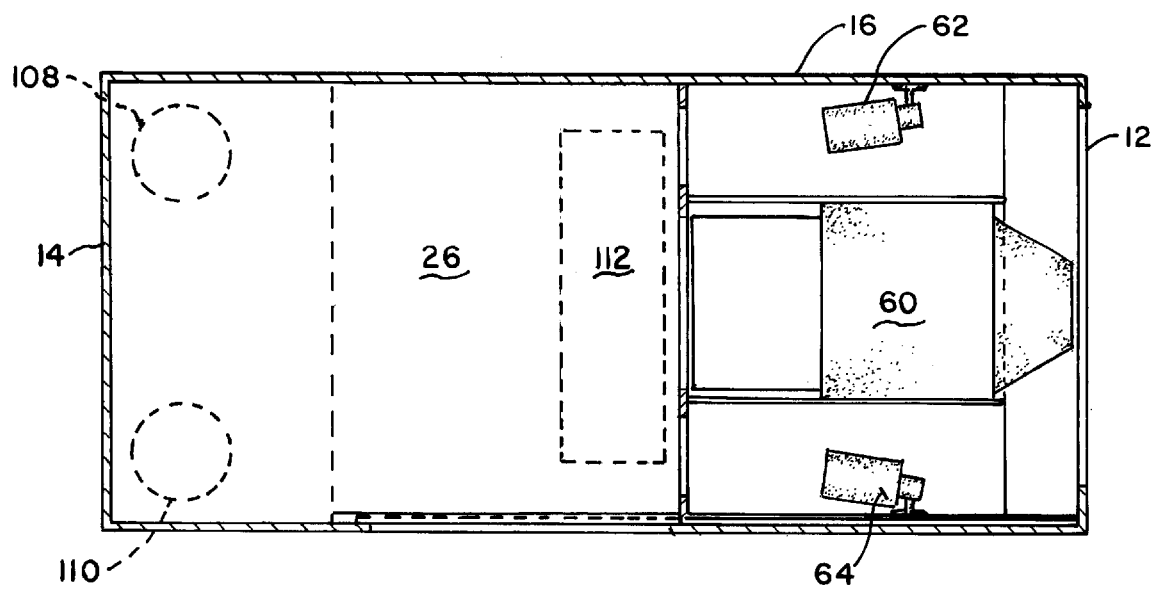
FIG. 2 is a plan view of the video recording booth.
Figure 3:
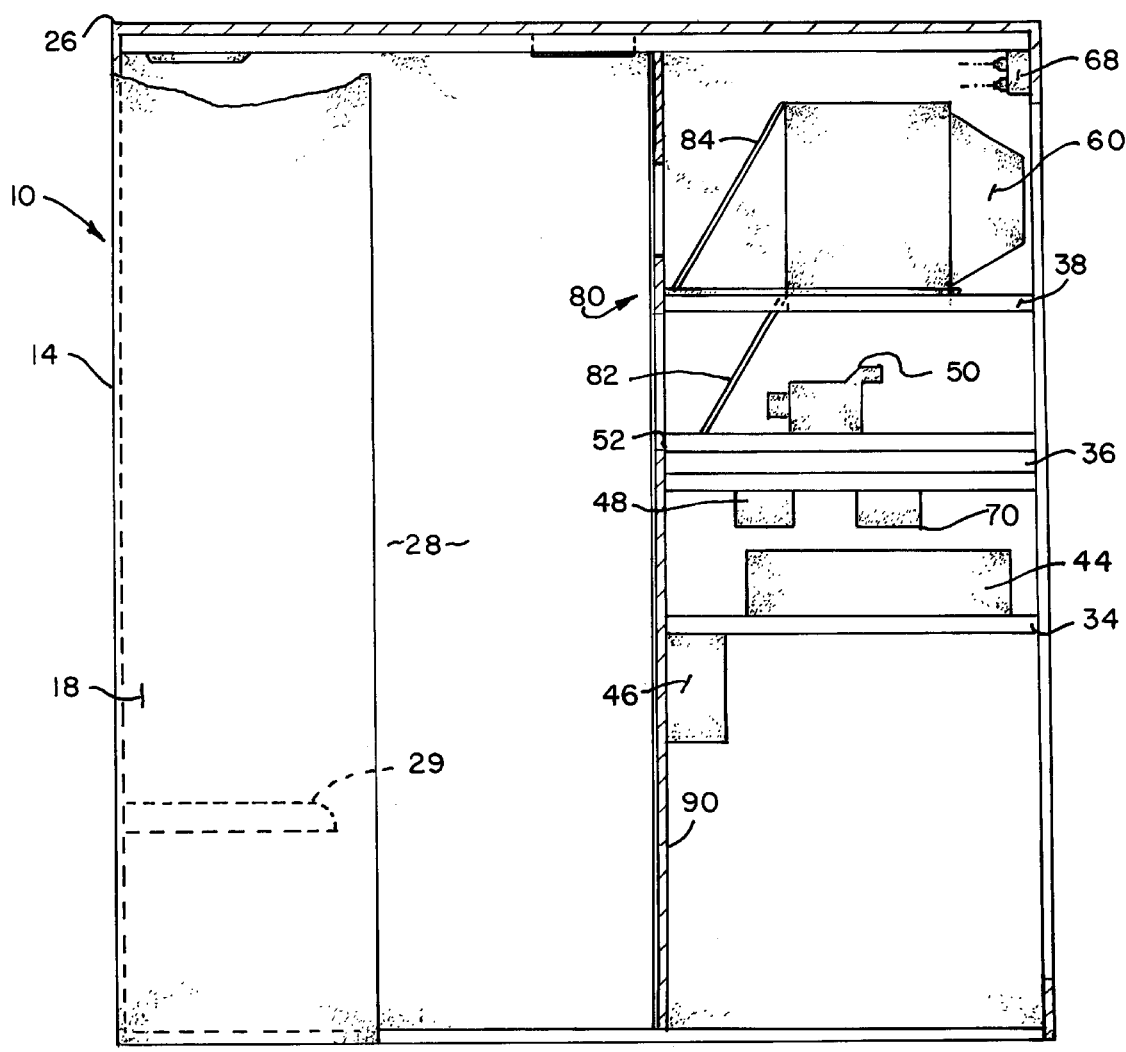
FIG. 3 is a side elevation view of the video recording booths.
Figure 6:
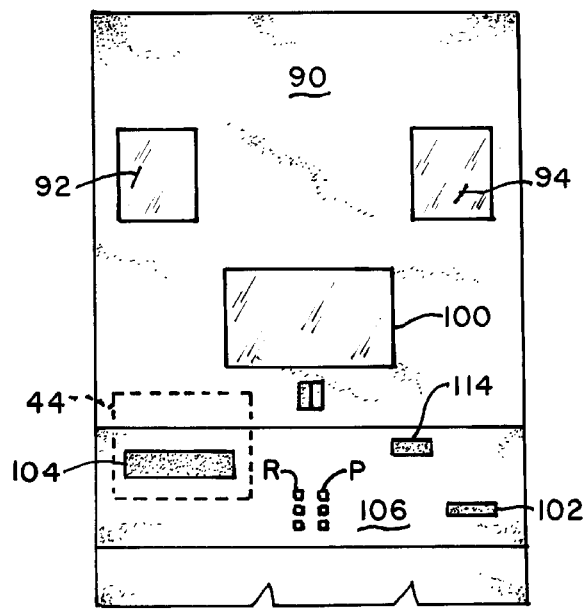
FIG. 6 is a view inside the booth illustrating the controls and the monitor window of the booth.

The video retail recording booth of the present invention is illustrated in the drawings at 10. This booth includes a plurality of vertical walls 12, 14, and 16. Front wall 18 includes an opening therein 20 to receive a suitable, movable door 22 mounted upon a track 24 in a roof or top 26.

The walls are conveniently made of cabinet grade plywood, as is the roof 26. It is also conveniently made of cabinet grade plywood. Booth 10 includes a portion 28 for a customer to enter and a suitable bench or seat 29 is provided.

Figure 4:
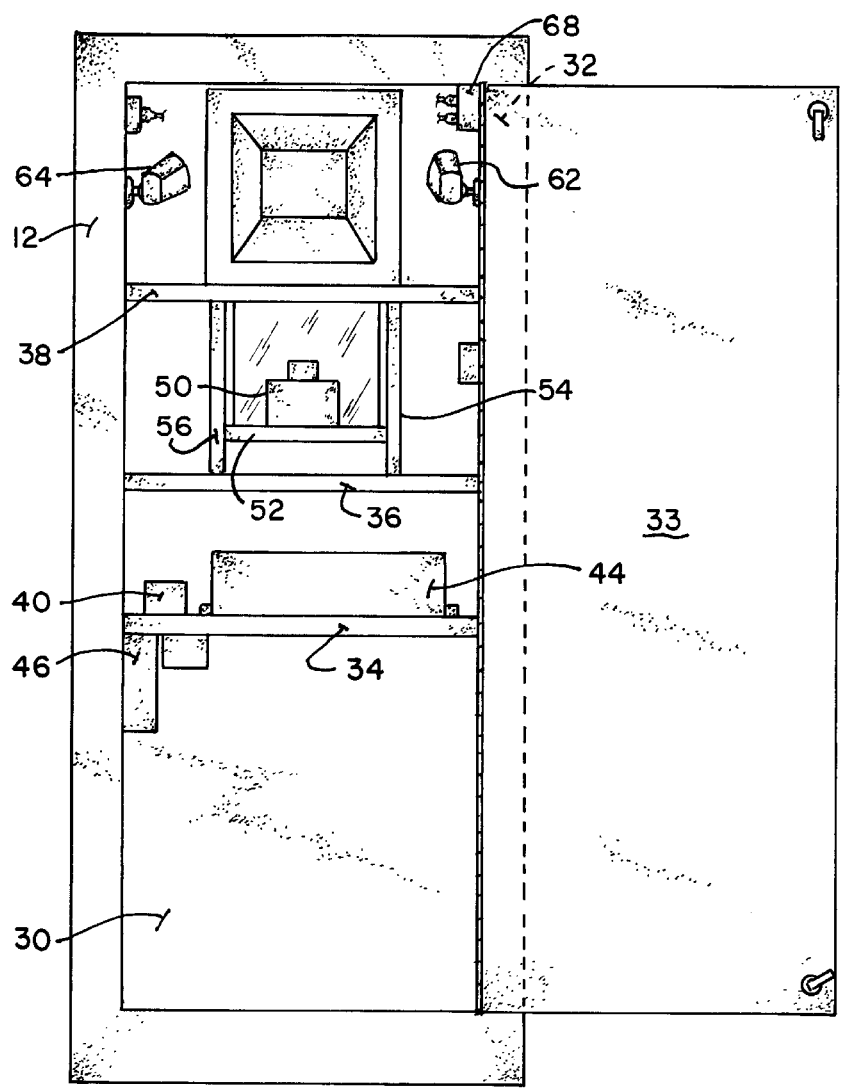
FIG. 4 is an end elevation view of the recording booth of the invention.

Referring to FIG. 4, wall 12 is provided with an open portion 30 and a vertical wall 12 is provided with a hinge 32 upon which is mounted a pivitable door 33.

A series of transverse shelves or supports 34, 36, and 38 are provided.

Shelves or supports are conveniently made of pressed wood and are attached to the vertical wall 12 with mechanical fasteners.

Mounted upon the lower support 34 is a camera power supply 40. An example of one suitable power supply is a Panasonic Model WO3203A. Conveniently it operates on 110 volts. Many such camera power supplies are available on the market.

Also, located upon the lower level 34 is a VCR 44. Any suitable VCR may be utilized which has a control which is not remotely controlled. In other words the VCR is controlled electrically from switches in the control and wires extend from the control to the VCR. One such is a Panasonic model AG200, operating on 110 volts and includes a industrial grounded plug. Another is a JVC BR6 400U.

A money receptacle 46 is also provided to receive money from the customer to operate the video recording booth. The receptacle is conveniently mounted upon the lower support 34 and vertical wall 12 by means of suitable brackets and/or fasteners (not shown).

A relay station controls the power supply to the systems is provided at 48. This circuit board runs on 110 volts and includes a transformer 116 to low voltage DC.

Camera 50 is mounted upon a supplementary transverse support 52 which in tern is supported by supplementary vertical support 54 and 56. The camera 50 is any suitable continuously operable color camera preferably a 110 volt. An example is a Panasonic CCDF2 color camera. Another example is a JVC color camera model #GZ534.

A monitor 60 is located upon the transversal support 38. The monitor is utilized to illustrate to the customer the video recording which is being made. Suitable monitors are presently available on the market. The monitor preferably operates on 120 volts and 60 cycles. A convenient model is a Panasonic Model #CT1400-MC. Another suitable monitor which and may be utilized is a NEC C12-20VA; Home Electronics (USA) Inc. 1255 Michael Drive Woodale, Ill. 60191.

A pair of lights 64 and 66 are provided and are conveniently located on either side of the monitor. A power supply for the lights is provided at 68. This power supply is a conveniently 110 volt supply separate from the camera power supply of 40 volts. This power supply is is used to control the overhead lighting 112. A second 110 V. power supply strip 69 is used to activate power supply 68, camera power supply 40, VCR 44, and monitor 60. From strip 69 power goes to power supply 68 to then control the overhead lighting from power supply strip 69.

Figure 5:
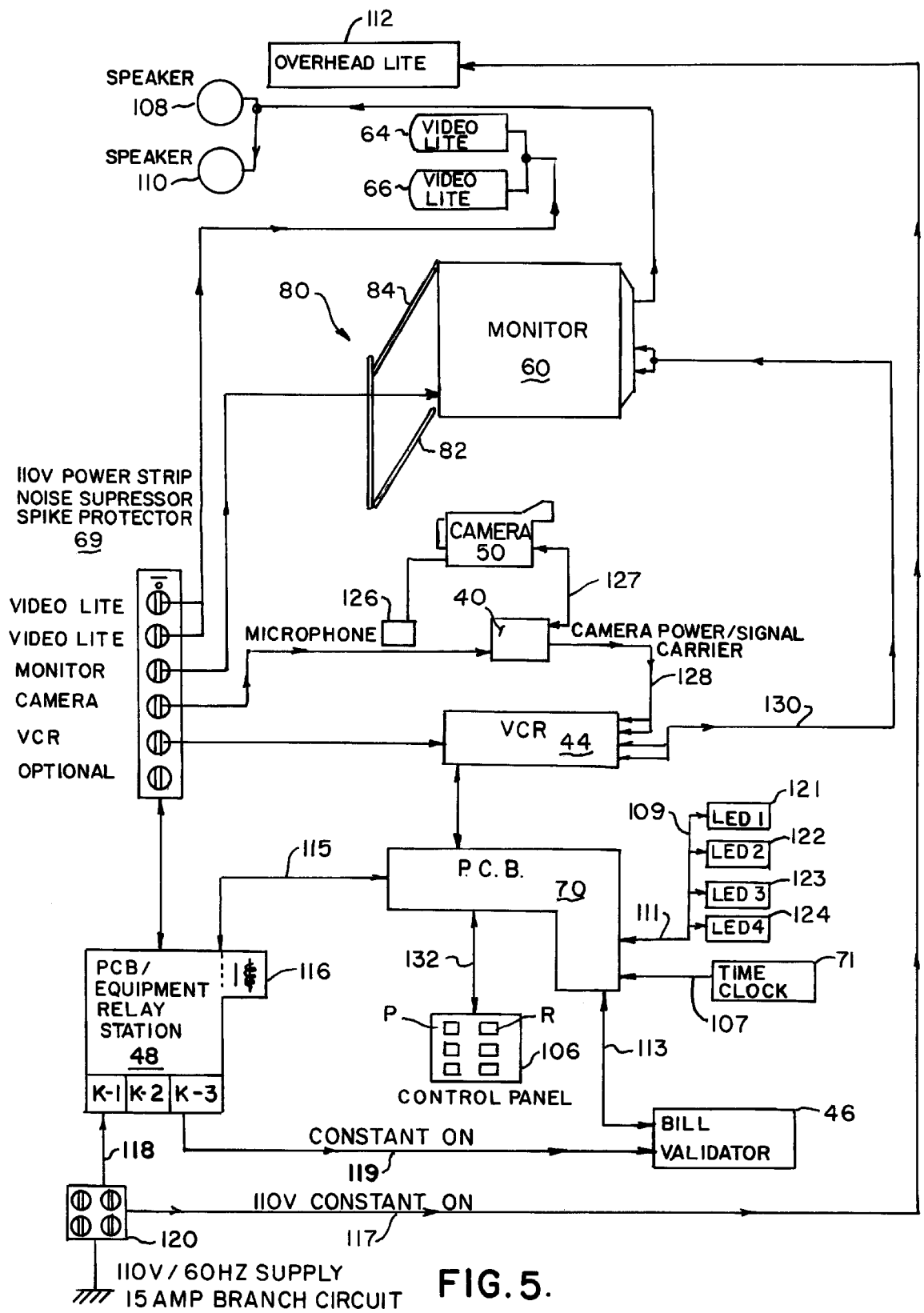
FIG. 5 is a schemhetic view side elevation view illustrating the mirrors to be utilized in the video recording booth.

A second control circuit 70 is provided in a suitable circuit board. Circuit 70 controls the VCR, the video lights, and the monitor. It controls the time of operation of the VCR as illustrated in FIG. 5.

A system of mirrors 80 is utilized to coordinate operation of the camera and the monitor. The camera has located adjacent it a mirror 82 which a reflection portion of the photograph, and allows a portion of light to pass through the mirrors. Suitable mirrors would allow 60% of the picture to pass through the mirror or as little as 40% to pass through the mirror. The remainder is deflected upwardly to the monitor 60. One suitable mirror is a Muflulato Optical Mirror made of ¼ inch plated glass which is optically coated. It is placed at an appropriate angle of 45 degrees.

The electrical signal is connected from the camera 50 to the monitor 60. The monitor 60 directs the pictures being taken to a second mirror 84 which is of more conventional construction and reflects 100% of the light which impinges upon it from the monitor 60. A suitable mirror is a ¼ inch 100% reflective plate glass. The images from the monitor then impinge upon the composite mirror 82 and allow a substantial portion to be transmitted to the customer.

A vertical panel 90 is provided in the booth which the customer observes as he sees upon the bench 29. Panel 90 includes windows 92 and 94 through which lights 64 and 66 light. The windows are made of ¼ inch DuPont CORSAIR LEXAN, a trademark of E I DuPont & Co. This LEXAN material is scratch resistant plastic.

Illustrated in the mid-portion of panel 90 is a window 100 also formed of LEXAN. The window 100 is located in front of the two-way mirror 82 and the camera 50 is located is behind the mirror 82. Monitor 60 is also located behind the panel 90 but is not visible.

The panel 90 includes a slot 102 for receiving money for example a dollar bill to activate the assembly. After inserting money into the slot 102, a video cassette is inserted into a second cassette slot 104 of suitable size. Slot 104 is aligned with the video cassette recorder 44 behind the panel. The money inserted into panel 90 activates the electrical system including circuit boards 48, and after insertion of the money, the customer may press "recording" which is "R" on the control panel 106 or "play" which is labeled "P" on the control panel.

If "R" is activated, the customer may have his image and voice recorded upon the VCR through the operation of the camera 50 and mirror 82. The monitor 60 which is electrically connected to the camera, provides images through the operation of mirrors 82 and 84. Voice is reproduced by means of a known electrical circuit and speakers 108 and 110 which are located in the booth 26. The booth is lighted by means of a suitable light 110 located in the roof of the booth.

Board 70 includes the timer 114 which is visible on the control panel 90 and illustrates to the customer how long he has remaining on his time period.

After the customer has completed his recording, he is given additional time to either rerecord the same cassette by again pressing "R" or playing back what he has recorded by pressing "P". At the end of the first sequence, the VCR tape is automatically rewound to the initial position.

ELECTRICAL DESCRIPTION

Referring to FIG. 5, a 110 volt four gang outlet box 120 is constantly on. An overhead light 112 stays on constantly, and gets power from box 120 through line 117. 110 volts is constantly applied to equipment relay station 48 through line 118. The relay station 48 sends low voltage power from transformer 116 to bill validator 46 through line 119. This low voltage power is constantly on.

The equipment relay station 48 includes a low loss, 110 v. crossover relay which is commercially available.

Control relay station 48 includes a voltage regulator with three high voltage (110) controls. A first relay K-1 controls the video lights 64 and 66. A second relay K-2 controls camera 50, VCR 44, and monitor 60. Relay K-3 controls the bill validator 46. These relays have a contact load of 140 V. at 4 amps, and a coil of 3–15 Volts D.C. The signals for these control relays are provided by printed circuit board 70. Low voltage power is sent to printed circuit board 48 through a line 115. The printed circuit boards 48 and 70 are comprised of light emitting diodes, and various transistor-transistor logic chips of different electronic characteristics. A signal from bill validator 46 is conveyed to circuit board by line 113. Printed circuit board 70 after appropriate electrical processing directs signals to light emitting diodes 121–124 through lines 111, and 107 and to time clock 71 through line 107. The time clock operates by counting pulses of the bill validator 46.

Printed circuit board 70 is a video control board which includes count-down timer 71, and automatic shut-off. Count-down timer 71 is controlled by bill validator 46 reading changes from money inserted into bill validator 46. Timer 71 has a 30 second delay before mandatory count-down begins. Before mandatory count-down, with the first requested function. Count-down times may be up-dated at any time during count-down by insertion of additional money.

Figure 7:
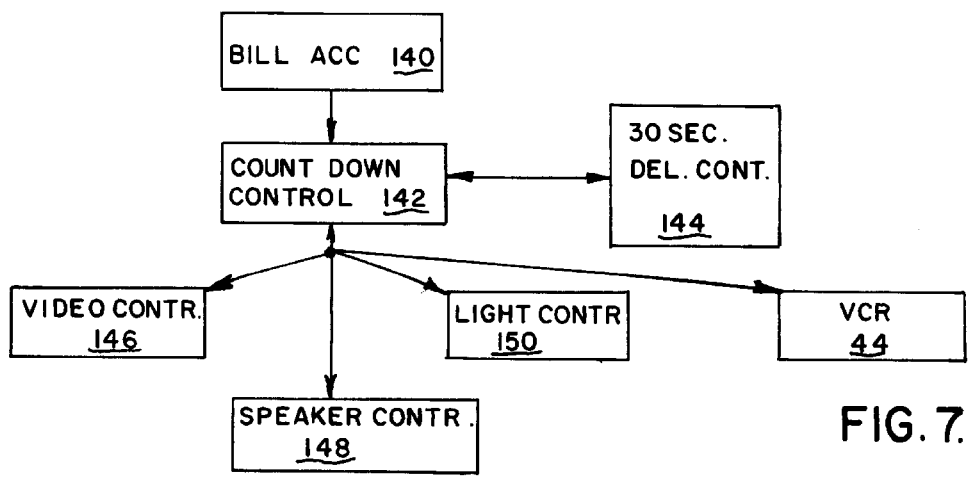
FIG. 7 is a schematic view of the operation of the controlling printed circuit board in the present invention.

Printed circuit board 70 contains a variety of integrated circuit chips divided into three basic control sections, bill accumulator control section, count-down timer control section, and the video control section. Referring to FIG. 7, the circuit board 70 includes a bill accumulator control section 140 which feeds signals to a count down control section 142 which operates in conjunction with a 30 second delay circuit 144. The count-down control circuit in turn controls the video control circuit 146, the speaker control circuit, 148, the light control circuit 150, and the controls in the VCR 44.

The video control section also utilizes the wired remote control of VCR 44. It controls fast forward, rewind, play, record, eject, and pause. These functions are only operable during the valid time on the count-down timer.

In the printed circuit board 70 the three control sections control the lights 64, 66, monitor 60, speakers 108, 110, camera 50 and VCR 44 to achieve the desired functions.

For example, the bill accumulator control section uses commercially available chips U-15, U-16, U-17. The count-down timer control section uses U1–U8, and U-29. The video control circuit uses chips U-23–U28, U32–U38, U10–U12, U42, and U43.

The control panel 106 sends a signal to printed circuit board to through line 132. This signal is processed in the printed circuit board, and is sent on the same frequency used in the wired remote control (not shown) of the VCR 44.

The microphone 126 is remoted out from camera 50. This signal is sent to camera power supply 40, along with the video signal from camera 50, through separate cables 127 and 128, all in one unit, to the VCR 44, and then to the monitor 60.

In operation, a first light emitting diode 121 states "Insert money to reach a desired time on clock."; such as $1.00 for one minute; $5.00 for five minutes.

Once a bill is inserted, the VCR 44, camera 50, and monitor 60 are turned on by printed circuit board 70, and the second light emitting diode 122 comes on and states "Insert Tape; select P to watch a tape or to make a tape." When P or R is pushed, the clock 71 starts counting down. If a customer does nothing, a 30 second delay is activated by circuit board 70.

Upon selection of R the video lights 66 are both activated and speakers 108, 110 are deactivated by circuit board 70, to avoid feed-back.

If P is selected, the customer will be able to watch and here a pre-recorded message or music on pre-recorded tape.

When 30 seconds are remaining on clock 71, clock 71 sends a signal through line 107 to printed circuit board 70 which lights up light emitting diode 123 which states "To continue without interruption, add more money now." If more money is added, printed circuit board 70 adds this new time to the time remaining. For example, if $1.00 is added to the time remaining, the time clock will change to 1:30.

When time runs out, the tape in VCR 44 automatically rewinds and waits for the next instruction. At this time light emitting diode 124 lights up and indicates "Bonus Time". Printed circuit board 70 adds back to the clock 71 the original time paid for.

Once this time runs out, the tape in VCR 44 automatically rewinds, ejects, and shuts down. Relay 48 shuts down VCR 44, camera 50, and monitor 60. At the end of operation, the system is manually turned off at box 120.

What is claimed is:

1. A video cassette retail recording and playback booth comprising:

wall means to define a booth;

means for supporting recording and playback equipment in the booth;

camera means located upon said support structure and aligned with a customer area in the booth;

video cassette recording means supported by said support structure in electrical communication with the camera;

camera monitor means in electrical communication with said camera, whereby material photographed by said camera and recorded on said video cassette recorder may be viewed simultaneously with the recording by the customer;

mirror means for reflecting the monitor image to a location readily viewed by the customer;

means for receiving a suitable fee to be provided by the customer;

said video cassette recording means including means for receiving a video cassette tape in said recording means;

an audio recording system located upon said support structure including means for recording any sound the customer would make while making a video;

video and audio cassette controlled means for operating said video cassette recorder and said audio recorder by the customer whereby either to make a video cassette recording, an audio cassette recording, a combination video/audio cassette recording, or to playback a video or audio cassette recording;

timing means for timing the operation of the video cassette recorder and audio cassette recorder;

and control means for simultaneous operation of the camera, video cassette recorder, audio cassette recorder, monitor and timing means.

2. A video cassette recording booth according to claim 1 wherein a pair a of mirrors are utilized and wherein at least one of these mirrors is a two-way mirror which allows light to pass there-through in part, and which mirror in part reflects light in the operation of said camera and reflection of light from said monitor.

3. A retail video cassette booth according to claim 2 wherein light means are provided in said booth and wherein said control means include means for controlling the operation of said lights.

4. A retail video cassette recording booth according to claim 3 wherein openings are provided to allow the lights to shine upon the customer and wherein a clear plastic window is provided over the openings.

5. A retail video cassette recording booth according to claim 4 wherein a window is provided between said camera and customer.

6. A video cassette retail recording and playback booth comprising:

wall means to define a booth;

means for supporting recording and playback equipment in the booth;

camera means located upon said support structure and aligned with a customer area in the booth;

video cassette recording means supported by said support structure in electrical communication with the camera;

camera monitor means in electrical communication with said camera, whereby material photographed by said camera and recorded on said video cassette recorder may be viewed simultaneously with the recording by the customer;

mirror means for reflecting the monitor image to a location readily viewable by the customer including at least a pair of mirrors and wherein at least one of said mirrors is a two-way mirror which allows light to pass there-through in part and which mirror in part reflects light, and whereby in the operation of said monitor, images are correctly viewable by the customer in an accurate and non-reversed manner;

means for receiving a suitable fee to be provided by the customer; said video cassette tape recording means including means for receiving cassette tape in said recording means;

an audio recording system located upon said support structure including means for recording any sound the customer would make while making a video;

video and audio cassette controlled means for operating said video cassette recorder by the customer whereby either to make a video cassette recording, an audio cassette recording, a combination video/audio cassette recording, or to playback a video or audio cassette recording;

timing means for timing the operation of the video cassette recorder and audio cassette recorder;

and control means for simultaneous operation of the camera, video cassette recorder, audio cassette recorder, monitor and timing means.

7. A retail video cassette booth according to claim 6 wherein light means are provided in said booth and wherein said control means include means for controlling the operation of said lights.

8. A retail video cassette recording booth according to claim 7 wherein openings are provided to allow the lights to shine upon the customer and wherein a clear plastic window is provided over the openings.

9. A retail video cassette recording booth according to claim 8 wherein a window is provided between said camera and customer.

* * * * *